United States Patent
Baller

(10) Patent No.: US 9,799,221 B2
(45) Date of Patent: Oct. 24, 2017

(54) TRIP DETERMINATION FOR MANAGING TRANSIT VEHICLE SCHEDULES

(71) Applicant: Global Traffic Technologies, LLC, St. Paul, MN (US)

(72) Inventor: Jonathan Baller, Stillwater, MN (US)

(73) Assignee: Global Traffic Technologies, LLC, St. Paul, MN (US)

( * ) Notice: Subject to any disclaimer, the term of this patent is extended or adjusted under 35 U.S.C. 154(b) by 189 days.

(21) Appl. No.: 14/705,685

(22) Filed: May 6, 2015

(65) Prior Publication Data

US 2016/0328969 A1 Nov. 10, 2016

(51) Int. Cl.
*G01S 19/14* (2010.01)
*G08G 1/127* (2006.01)
*G08G 1/087* (2006.01)

(52) U.S. Cl.
CPC .............. *G08G 1/127* (2013.01); *G01S 19/14* (2013.01); *G08G 1/087* (2013.01)

(58) Field of Classification Search
None
See application file for complete search history.

(56) References Cited

U.S. PATENT DOCUMENTS

| | | | |
|---|---|---|---|
| 5,539,398 A | 7/1996 | Hall et al. | |
| 5,952,941 A | 9/1999 | Mardirossian | |
| 6,184,802 B1 * | 2/2001 | Lamb | G08G 1/123 340/988 |
| 6,243,026 B1 | 6/2001 | Jones et al. | |
| 7,098,806 B2 | 8/2006 | Bachelder | |
| 7,327,280 B2 | 2/2008 | Bachelder et al. | |
| 7,432,826 B2 | 10/2008 | Schwartz | |
| 8,954,268 B1 * | 2/2015 | Stewart | G01C 21/20 701/465 |
| 2003/0193413 A1 * | 10/2003 | Jones | G06Q 10/08 340/994 |

(Continued)

FOREIGN PATENT DOCUMENTS

| DE | 19944310 A1 | 3/2001 |
|---|---|---|
| EP | 0702820 A1 | 3/1996 |

(Continued)

OTHER PUBLICATIONS

Wyoming Department of Transportation, "The 2011 State of Wyoming Driver License Manual," Jul. 2011, pp. 1-96.

*Primary Examiner* — Truc M Do
(74) *Attorney, Agent, or Firm* — Crawford Maunu PLLC

(57) ABSTRACT

Approaches for managing transit vehicle schedules. The method includes determining a current location and current heading of a transit vehicle by a global positioning system (GPS) module aboard the transit vehicle and communicating the current location and current heading to a computer processor. The computer processor determines a current time and current day, and a trip schedule is selected from a plurality of trip schedules in a database. The selected trip schedule has attributes consistent with the current location, current heading, current time, and current day. The method determines whether the transit vehicle is ahead of the selected trip schedule or behind the selected trip schedule. An output signal indicates whether the transit vehicle is ahead of or behind schedule.

9 Claims, 6 Drawing Sheets

(56) References Cited

U.S. PATENT DOCUMENTS

| | | | |
|---|---|---|---|
| 2004/0113772 A1* | 6/2004 | Hong Chou | G08G 1/202 340/539.13 |
| 2005/0182538 A1 | 8/2005 | Phelan et al. | |
| 2006/0074545 A1* | 4/2006 | Kim | G08G 1/123 701/117 |
| 2008/0195428 A1* | 8/2008 | O'Sullivan | G06Q 10/00 705/6 |
| 2009/0125218 A1* | 5/2009 | Lee | G08G 1/092 701/117 |
| 2010/0030612 A1* | 2/2010 | Kim | G01C 21/362 705/7.18 |
| 2010/0088026 A1* | 4/2010 | Manolescu | G08G 1/20 701/469 |
| 2010/0253549 A1* | 10/2010 | Kim | G08G 1/123 340/994 |
| 2010/0318285 A1* | 12/2010 | Kim | G08G 1/092 701/117 |
| 2011/0077028 A1 | 3/2011 | Wilkes, III et al. | |
| 2011/0109477 A1* | 5/2011 | Edwardson | G08G 1/087 340/906 |
| 2011/0193722 A1* | 8/2011 | Johnson | G08G 1/081 340/906 |
| 2011/0221615 A1* | 9/2011 | Chiu | G08G 1/123 340/988 |
| 2011/0234423 A1* | 9/2011 | Edwardson | G08G 1/087 340/906 |
| 2011/0304476 A1* | 12/2011 | Johnson | G08G 1/081 340/906 |
| 2012/0326890 A1* | 12/2012 | Cross | G08G 1/087 340/906 |
| 2012/0326891 A1 | 12/2012 | Cross | |
| 2013/0048795 A1 | 2/2013 | Cross | |
| 2013/0234868 A1* | 9/2013 | Koth | G08G 1/127 340/994 |
| 2014/0062790 A1* | 3/2014 | Letz | H04L 67/1095 342/386 |
| 2014/0125498 A1* | 5/2014 | Curry | G08G 1/087 340/906 |
| 2014/0180575 A1* | 6/2014 | Lin | G08G 1/123 701/465 |
| 2014/0267399 A1* | 9/2014 | Zamer | H04L 67/20 345/633 |
| 2014/0288821 A1* | 9/2014 | Modica | G06Q 50/30 701/465 |
| 2015/0046083 A1* | 2/2015 | Maitra | G08G 1/123 701/465 |
| 2016/0104081 A1* | 4/2016 | Ho | G06Q 10/0633 705/7.27 |

FOREIGN PATENT DOCUMENTS

| | | |
|---|---|---|
| EP | 1584081 A1 | 10/2005 |
| EP | 2843644 A2 | 3/2015 |
| FR | 2444984 A1 | 7/1980 |
| WO | 00/63866 A1 | 10/2000 |
| WO | 2006/138393 A2 | 12/2006 |
| WO | 2011/085074 A1 | 7/2011 |
| WO | 2013/003504 A2 | 1/2013 |

* cited by examiner

TRIP DETERMINATION FOR MANAGING TRANSIT VEHICLE SCHEDULES

FIELD OF THE INVENTION

The disclosure is generally directed to managing transit vehicle schedules.

BACKGROUND

Traffic signals have long been used to regulate the flow of traffic at intersections. Generally, traffic signals have relied on timers or vehicle sensors to determine when to change traffic signal lights, thereby signaling alternating directions of traffic to stop, and others to proceed.

Emergency vehicles, such as police cars, fire trucks and ambulances, generally have the right to cross an intersection against a traffic signal. Emergency vehicles have in the past typically depended on horns, sirens and flashing lights to alert other drivers approaching the intersection that an emergency vehicle intends to cross the intersection. However, due to hearing impairment, air conditioning, audio systems and other distractions, often the driver of a vehicle approaching an intersection will not be aware of a warning being emitted by an approaching emergency vehicle.

Traffic control preemption systems assist authorized vehicles (police, fire and other public safety or transit vehicles) through signalized intersections by making preemption requests to the intersection controllers that control the traffic lights at the intersections. The intersection controller may respond to the preemption request from the vehicle by changing the intersection lights to green in the direction of travel of the approaching vehicle. This system improves the response time of public safety personnel, while reducing dangerous situations at intersections when an emergency vehicle is trying to cross on a red light. In addition, speed and schedule efficiency can be improved for transit vehicles.

There are presently a number of known traffic control preemption systems that have equipment installed at certain traffic signals and on authorized vehicles. One such system in use today is the OPTICOM® system. This system utilizes a high power strobe tube (emitter), which is located in or on the vehicle, that generates light pulses at a predetermined rate, typically 10 Hz or 14 Hz. A receiver, which includes a photodetector and associated electronics, is typically mounted on the mast arm located at the intersection and produces a series of voltage pulses, the number of which are proportional to the intensity of light pulses received from the emitter. The emitter generates sufficient radiant power to be detected from over 2500 feet away. The conventional strobe tube emitter generates broad spectrum light. However, an optical filter is used on the detector to restrict its sensitivity to light only in the near infrared (IR) spectrum. This minimizes interference from other sources of light.

Intensity levels are associated with each intersection approach to determine when a detected vehicle is within range of the intersection. Vehicles with valid security codes and a sufficient intensity level are reviewed with other detected vehicles to determine the highest priority vehicle. Vehicles of equivalent priority are selected in a first come, first served manner. A preemption request is issued to the controller for the approach direction with the highest priority vehicle travelling on it.

Another common system in use today is the OPTICOM Global Positioning System (GPS) priority control system. This system utilizes a GPS receiver in the vehicle to determine location, speed and heading of the vehicle. The information is combined with security coding information that consists of an agency identifier, vehicle class, and vehicle ID, and is broadcast via a proprietary 2.4 GHz radio.

An equivalent 2.4 GHz radio located at the intersection along with associated electronics receives the broadcasted vehicle information. Approaches to the intersection are mapped using either collected GPS readings from a vehicle traversing the approaches or using location information taken from a map database. The vehicle location and direction are used to determine on which of the mapped approaches the vehicle is approaching toward the intersection and the relative proximity to it. The speed and location of the vehicle is used to determine the estimated time of arrival (ETA) at the intersection and the travel distance from the intersection. ETA and travel distances are associated with each intersection approach to determine when a detected vehicle is within range of the intersection and therefore a preemption candidate. Preemption candidates with valid security codes are reviewed with other detected vehicles to determine the highest priority vehicle. Vehicles of equivalent priority are selected in a first come, first served manner. A preemption request is issued to the controller for the approach direction with the highest priority vehicle travelling on it.

With metropolitan wide networks becoming more prevalent, additional means for detecting vehicles via wired networks, such as Ethernet or fiber optics, and wireless networks, such as cellular, Mesh or 802.11b/g, may be available. With network connectivity to the intersection, vehicle tracking information may be delivered over a network medium. In this instance, the vehicle location is either broadcast by the vehicle itself over the network or it may be broadcast by an intermediary gateway on the network that bridges between, for example, a wireless medium used by the vehicle and a wired network on which the intersection electronics resides. In this case, the vehicle or an intermediary reports, via the network, the vehicle's security information, location, speed and heading along with the current time on the vehicle, intersections on the network receive the vehicle information and evaluate the position using approach maps as described in the Opticom GPS system. The security coding could be identical to the Opticom GPS system or employ another coding scheme.

It is important for transit vehicles to adhere to published schedules in order to satisfy riders' needs and ultimately to ensure the success of designated routes. If a transit vehicle arrives late to a scheduled stop or departs early, riders may be inconvenienced by having to wait for the next transit vehicle. If transit vehicles persistently fail to adhere to the published schedules, some riders may opt for alternative means of transportation, and declining ridership may affect the financial viability of certain routes.

SUMMARY

According to one embodiment, a method is provided for managing transit vehicle schedules. The method includes determining a current location and current heading of a transit vehicle by a global positioning system (GPS) module aboard the transit vehicle and communicating the current location and current heading to a computer processor. The computer processor determines a current time and current day, and a trip schedule is selected from a plurality of trip schedules in a database. The selected trip schedule has attributes consistent with the current location, current heading, current time, and current day. The method determines whether the transit vehicle is ahead of the selected trip schedule or behind the selected trip schedule. A signal is output to indicate whether the transit vehicle is ahead of or behind the selected trip schedule. The output signal may trigger numerous actions. For example, a priority request device may be enabled to make traffic signal priority (TSP) requests in response to the transit vehicle being behind the one trip schedule or disabled from making TSP requests in response to the transit vehicle being ahead of the one trip schedule. Alternatively, or in combination, the output signal may trigger the display of scheduling information to a driver, trigger the communication of scheduling information to a central dispatcher or to riders, or trigger the communication of scheduling information to other devices on other transit vehicles.

A system for managing transit vehicle schedules is provided in another embodiment. The system includes a priority request device configured to be mounted to a transit vehicle, a memory, a global positioning system (GPS) module, and a computer processor coupled to the memory and to the GPS module. The memory is configured to store a plurality of trip schedules and instructions that when executed by the computer processor cause the computer processor to determine a current time, a current day, a current location, and a current heading of a transit vehicle from the GPS module. The computer processor selects a trip schedule from the plurality of trip schedules. The selected trip schedule has attributes consistent with the data specifying the current time, the current day, the current location, and the current heading of the transit vehicle. The method determines whether the transit vehicle is ahead of the one trip schedule or behind the one trip schedule. A signal is output to indicate whether the transit vehicle is ahead of or behind the selected trip schedule. The output signal may trigger numerous actions such as those described above.

Another system for managing transit vehicle schedules includes a priority request device configured to be mounted to a first transit vehicle. The priority request device is configured to determine a current time, a current day, a current location and a current heading of a transit vehicle and transmit data specifying the current time, the current day, the current location, and the current heading of the transit vehicle. The system further includes a transit-stop module configured for placement at a transit stop. The transit stop module is configured to store a plurality of trip schedules and receive the data specifying the current time, the current day, the current location, and the current heading of the transit vehicle. The transit stop module selects a trip schedule from the plurality of trip schedules. The selected trip schedule has attributes consistent with the data specifying the current time, the current day, the current location, and the current heading of the transit vehicle. The transit stop module transmits the one trip schedule to the priority request device. The priority request device is further configured to determine whether the transit vehicle is ahead of the one trip schedule or behind the one trip schedule, and output a signal to indicate whether the transit vehicle is ahead of or behind the selected trip schedule. The output signal may trigger numerous actions such as those described above.

Yet another system for managing transit vehicle schedules includes a priority request device, a transit stop module, and a server. The priority request device is configured to be mounted to a first transit vehicle and is configured to determine a current time, a current day, a current location, and a current heading of a transit vehicle from a global positioning system (GPS) module aboard the transit vehicle. The priority request device is further configured to transmit data specifying the current time, the current day, the current location, and the current heading of the transit vehicle. The transit-stop module is configured to receive the data specifying the current time, the current day, the current location, and the current heading of the transit vehicle from the priority request device and transmit the data specifying the current time, the current day, the current location, and the current heading of the transit vehicle to the server. The server is configured to store a plurality of trip schedules and receive the data specifying the current time, the current day, the current location, and the current heading of the transit vehicle from the transit-stop module. The server is further configured to select a trip schedule from the plurality of trip schedules. The selected trip schedule has attributes consistent with the data specifying the current time, the current day, the current location, and the current heading of the transit vehicle. The server transmits the selected trip schedule to the transit-stop module, and the transit-stop module is further configured to receive the one trip schedule from the server and transmit the one trip schedule to the priority request device. The priority request device is further configured to determine whether the transit vehicle is ahead of or behind the selected trip schedule. A signal is output to indicate whether the transit vehicle is ahead of or behind the selected trip schedule. The output signal may trigger numerous actions such as those described above.

Another system for managing transit vehicle schedules includes a priority request device and a server. The priority request device is configured to be mounted to a first transit vehicle and configured to determine a current time, a current day, a current location and a current heading of a transit vehicle. The priority request device transmits data specifying the current time, the current day, the current location, and the current heading of the transit vehicle to the server. The server is communicatively coupled to the priority request device and is configured to store a plurality of trip schedules and receive the data specifying the current time, the current day, the current location, and the current heading of the transit vehicle. The server selects a trip schedule from the plurality of trip schedules. The selected trip schedule has attributes consistent with the data specifying the current time, the current day, the current location, and the current heading of the transit vehicle. The server transmits the selected trip schedule to the priority request device. The priority request device is further configured to determine whether the transit vehicle is ahead of or behind the selected trip schedule. A signal is output to indicate whether the transit vehicle is ahead of or behind the selected trip schedule. The output signal may trigger numerous actions such as those described above.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

DETAILED DESCRIPTION

Figure 1:
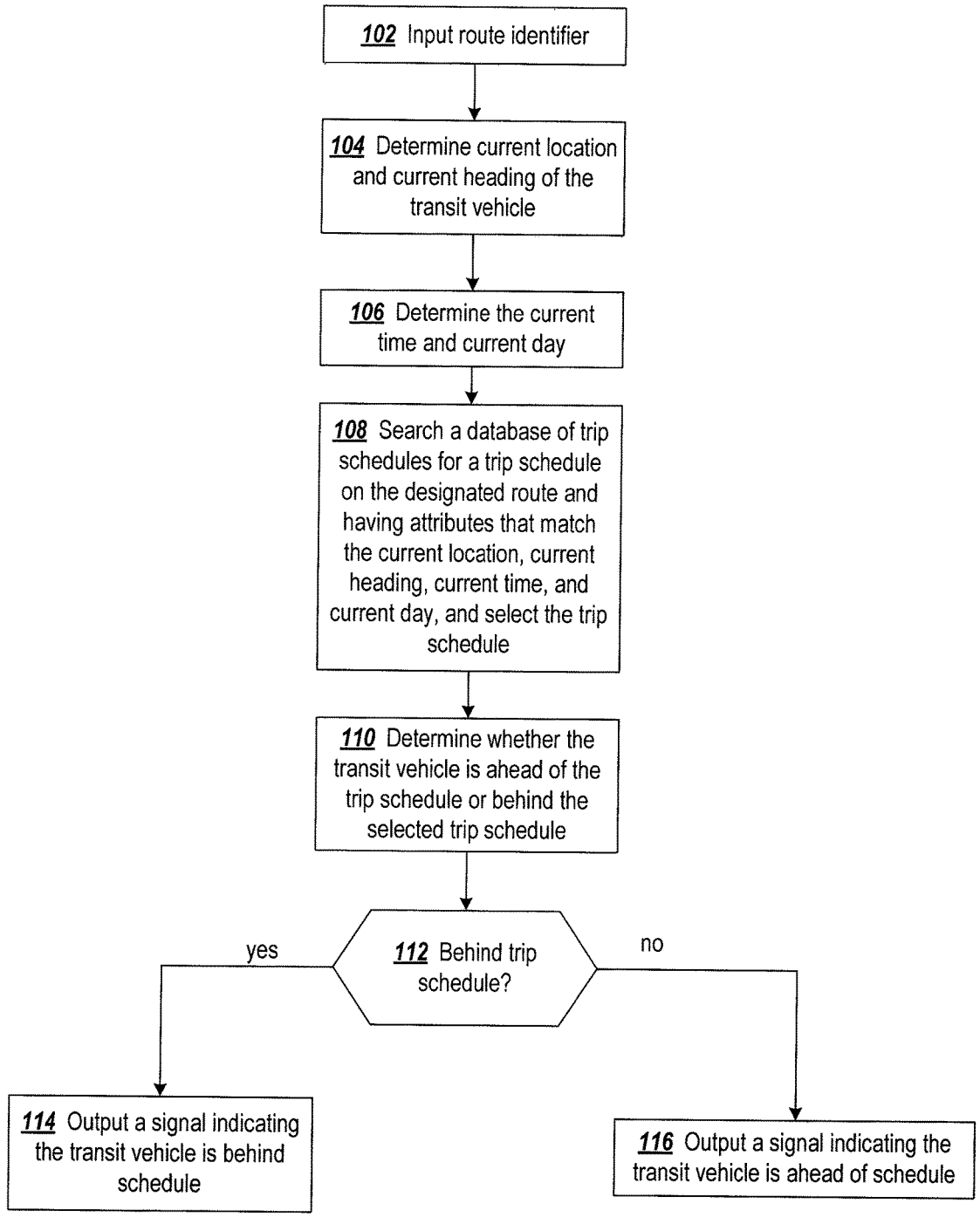
FIG. 1 is a flowchart of an example process for automatically determining a trip schedule for a transit vehicle.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

A "route" refers to a path that a transit vehicle follows between two end points or in a circuit. A route includes multiple street segments and transit vehicle stops. A "trip" follows a particular route and has a designated starting location on the route and a designated start time at which a transit vehicle servicing the trip leaves the starting location. A trip also includes a designated subset of the transit vehicle stops on the route and associated stop times. Different routes may share the same starting location, and different trips may follow the same route.

The disclosed systems and methods simplify the configuration of trip information in equipment aboard transit vehicles. Proper trip information is important, because the information specifies the schedule of stops for the transit vehicle, and a number of actions may be automatically triggered based on the current time and location of the transit vehicle relative to the next scheduled stop. With the disclosed systems and methods, the trip information is automatically determined, and the equipment automatically configured. The automated approach may greatly reduce or even eliminate errors that may be introduced through manual identification of a particular trip and manual configuration of vehicle equipment.

The current location and current heading of a transit vehicle are determined by a global positioning system (GPS) module aboard the transit vehicle and communicated to a computer processor. The processor determines the current time and day, and based on the current time, day, location, and heading, the processor selects a trip schedule having exact matching or closest matching attribute values. Once a trip has been selected, the scheduled stops of the trip in conjunction with continuously updated current location and heading of the transit vehicle may be used to determine whether or not the transit vehicle is ahead of or behind schedule. A signal may be output to indicate whether the transit vehicle is ahead of or behind the selected trip schedule, and the output signal may trigger numerous actions, such as enabling or disabling TSP requests, displaying scheduling information to a driver, and/or communicating scheduling information to a central dispatcher, riders, or to other devices on other transit vehicles.

FIG. 1 is a flowchart of an example process for automatically determining a trip schedule for a transit vehicle. At block 102, a route identifier is input to a computer processor, for example. The route identifier may be input by a vehicle driver, for example, and may aid in the selection of the trip, because different trips may follow different routes but have the same starting location, start time, and heading.

At block 104, the current location and current heading of the transit vehicle are determined by a global positioning system (GPS) module aboard the transit vehicle. The GPS module communicates the current location and current heading to the computer processor, and the computer processor determines the current day and time at block 106.

At block 108, the computer processor searches a database of trip schedules for a trip schedule having attribute values that match the current location, current heading, current time, and current day. The matching trip schedule is selected.

Each trip schedule in the database specifies a starting location having an associated heading, an associated start time, and an associated day. If one of the trip schedules has a starting location, an associated heading, an associated start time, and an associated day that match the current location, the current heading, the current day, and the current time, then an exact match trip schedule has been found.

In some scenarios, an exact matching trip schedule may not be found. For example, the current location of the transit vehicle may not match the starting location of any trip schedule. The scenario may arise due to construction at the starting location or a disabled transit vehicle, for example. If it is determined that none of the trip schedules has a starting location that matches the current location, different match criteria may be used. For example, in one implementation, the alternative match criteria may include a stop location and an associated stop time. If the current location and current time match a stop location and the associated stop time in one of the trip schedules, then that trip schedule is selected. Other approaches for determining a matching trip schedule when an exact matching trip schedule is not found are described in the description of FIG. 3.

At block 110, the computer processor determines whether the transit vehicle is behind or ahead of schedule. The determination may be accomplished in at least two ways. In one approach, the location and speed of the vehicle may be periodically determined and the current location, current speed, and current heading updated accordingly, and the time of arrival at a scheduled stop may be estimated. A second approach is described in patent application Ser. No. 14/277,976, entitled, "Managing Transit Signal Priority (TSP) Requests", by Eichhorst et al., which is assigned to the assignee of the present invention and hereby incorporated by reference in its entirety. In the second approach, the determination of whether the transit vehicle is behind or ahead of schedule is made using actual arrival/departure times at transit stops and the designated scheduled arrival/departure times at the stops.

If the transit vehicle is behind the trip schedule, decision block 112 directs the process to block 114. At block 114, the computer processor outputs a signal indicating that the transit vehicle is behind schedule. The output signal may trigger actions such as enabling the sending of TSP requests by the priority request device in response to an enable signal from the computer processor. If the transit vehicle is ahead of the trip schedule, decision block 112 directs the process to block 116. At block 116, the computer processor outputs a signal indicating that the transit vehicle is ahead of schedule. The output signal may trigger actions such as disabling the sending of TSP requests by the priority request device in response to a disable signal from the computer processor. The output signal may trigger other actions such as displaying scheduling information to a driver, and/or communicating scheduling information to a central dispatcher, riders, or to other devices on other transit vehicles.

Figure 2:
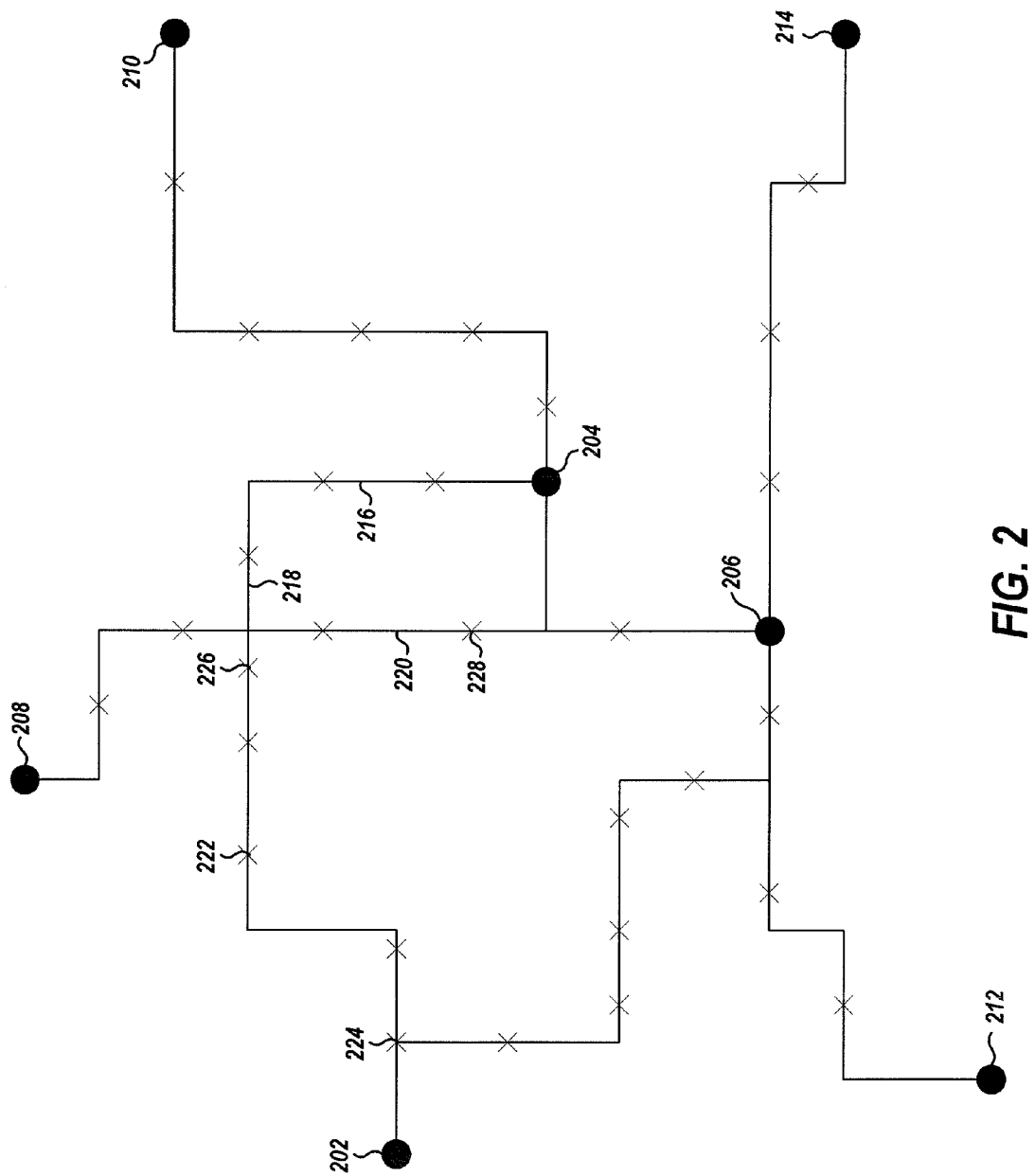
FIG. 2 depicts examples of multiple routes and trips that transit vehicles may service.

FIG. 2 depicts examples of multiple routes and trips that transit vehicles may service. Lines represent road segments, filled circles represent starting and ending locations of a route, and each "X" marks a transit vehicle stop.

Multiple routes may begin at the same location and end at different locations. For example, two routes may begin at location 202, one of the routes may end at location 204, and the other route may end at location 206. Different routes may begin at different locations and end at the same location, for example, one route may begin at location 208, another route may begin at location 210, and both routes may end at location 204. The starting location of one route may be the end location of another route. For example, location 212 may be the starting location and location 202 may be the end location of one route, and another route may begin at location 202 and end at location 204. A route may be a circuit. For example, a route may begin at location 214, have a stop at location 206, another stop at location 204, continue on stops on road segments 216, 218, and 220, and stop again at location 206 before returning to location 214.

Different trips may begin at the same location on the same route. For example, multiple trips may begin at location 202 and end at location 204 and all follow the same route. Each trip may have different stop times associated with the same stops. For example, one trip on the 202-204 route may have a scheduled stop time of 8:12 a.m. at stop 222, and another trip on the 202-204 route may have a scheduled stop time of 8:27 a.m. at stop 222.

Different trips may have different sets of stops along the route. For example, weekday trips may have one set of stops, and weekend trips may have a reduced set of stops. A weekday trip on the 202-204 route may include all the stops indicated in the drawing, and a weekend trip on the 202-204 route may include only stops 224, 222, 226, and 228.

Figure 3:
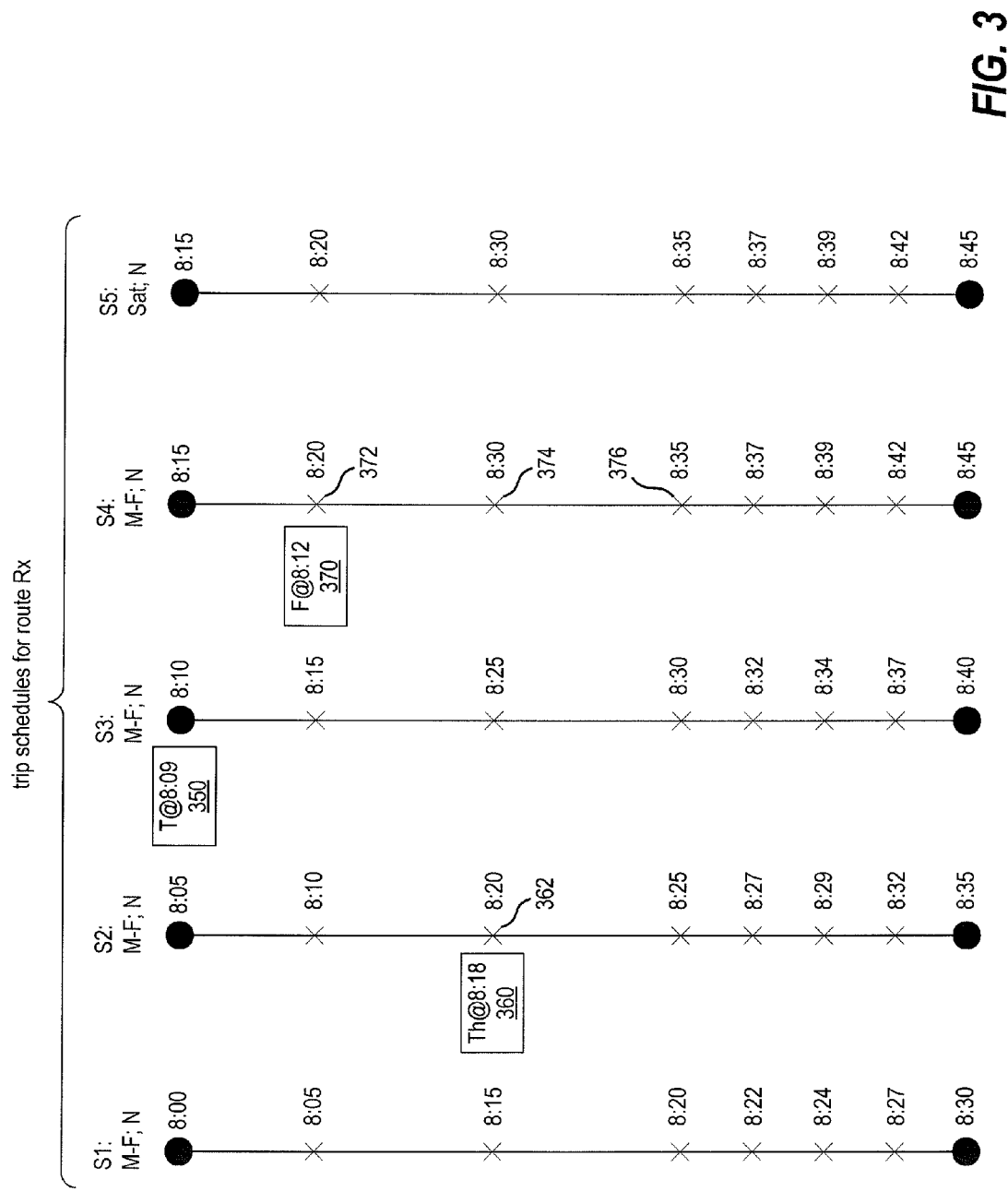
FIG. 3 shows different trip schedules for a route and different approaches for identifying a trip that matches attribute values of a transit vehicle in different scenarios.

FIG. 3 shows different trip schedules for a route and different approaches for identifying a trip that matches attribute values of a transit vehicle in different scenarios. Each of trip schedules S1, S2, S3, S4, and S5 of the route is represented by a vertical line, with starting and ending locations represented as filled circles, and each stop indicated with "X." Because FIG. 3 shows different trips for the same route, the illustrated starting locations all represent the same physical location, and the illustrated end locations all represent the same physical location. Similarly, a single stop location is represented by an aligned row of X marks. The starting and ending locations and stop locations have associated times as indicated. Each trip schedule specifies coordinates of the starting location, day(s) of week (shown as M-F or Sat), a direction (one of N, S, E or W), a start time, and coordinates of stop locations having associated stop times. The example trip schedules have identifiers S1, S2, S3, S4, and S5 in the diagram.

Blocks 350, 360, and 370 illustrate different scenarios and schemes for selecting a schedule based on the arrival time of a transit vehicle at either the starting location or one of the stops on the trip schedules. Each block indicates a day and time of arrival at a location, and the vertical position of each block indicates the location of the transit vehicle on the route. Each block is to the immediate left of the trip schedule selected according to the selection scheme.

Block 350 represents a transit vehicle headed north and arriving at the starting location at 8:09 on a Tuesday. According to the selection scheme, the vehicle location matches the starting location, the vehicle heading matches the route heading, and the arrival time is closest to the start time for schedule S3, which is effective Monday-Friday. The start time that is nearest the actual arrival time is considered a match, because the actual arrival time may not be exactly equal to the possible start times of the different trip schedules.

Blocks 360 and 370 represent scenarios in which the transit vehicles did not establish trip schedules at the starting location. These scenarios may be the result of detours, vehicle failures, or GPS variation, for example. In these scenarios, equipment aboard the transit vehicle may have been unable to establish the appropriate trip schedule at the starting location of the route.

Block 360 represents a transit vehicle headed north and arriving at stop location 362 at 8:18 on a Thursday. Upon the vehicle's arrival at the stop location 362, the schedule having a stop at the vehicle location and having a stop time that is closest to the arrival time is selected. Schedule S2 matches and is selected, because the stop time at stop 362 most closely matches the arrival time 8:18 of the transit vehicle. Also, the current day (Thursday) matches the days (Monday-Friday) for which schedule S2 is effective. Each stop indicated in a trip schedule may also have an associated direction indicator, and the current heading of the vehicle must match the direction indicator associated with the stop. According to one selection scheme, the trip schedule having a stop and associated stop time that is later than and nearest to the arrival time may be selected, as illustrated. In other words, the matching trip schedule has a stop location that matches the current location, and the associated stop time is later than the current time and earlier than all the stop times that are later than the current time and associated with the stop location in other trip schedules.

Alternatively, the trip schedule having a stop and associated stop time that is earlier than and nearest to the arrival time may be selected, which would be trip schedule S1 for block 360. In other words, the matching trip schedule has a stop location that matches the current location, and the associated stop time is earlier than the current time and later than all the stop times that are earlier than the current time and associated with the stop location in the other trip schedules.

Block 370 represents a transit vehicle headed north and arriving at stop location 372 at 8:12 on a Friday. Upon the vehicle's arrival at the stop location 372, the schedule having a stop at location 372 and having a start time that is later than the arrival time and nearer the arrival time than the start times of the other trip schedules is selected. Schedule S4 is selected, because the start time 8:15 is the next start time to follow the arrival time 8:12 on a Friday. The scheduled stop times of S4 may be adjusted for the particular transit vehicle based on the time difference between the stop location 372 and the starting location. The difference between the stop time at stop 372 and the start time is 5 minutes (8:20-8:15). The 5 minute difference may be subtracted from the subsequent stop times in the schedule S4, because the transit vehicle is ahead of schedule. For example, the stop time at stop 374 may be adjusted to 8:25, and the stop time at stop 376 may be adjusted to 8:30. The adjusted stop times may then be used in determining whether or not the transit vehicle is ahead of or behind schedule for purposes of enabling or disabling TSP requests, displaying scheduling information to a driver, and/or communicating scheduling information to a central dispatcher, riders, or to other devices on other transit vehicles.

Figure 4:
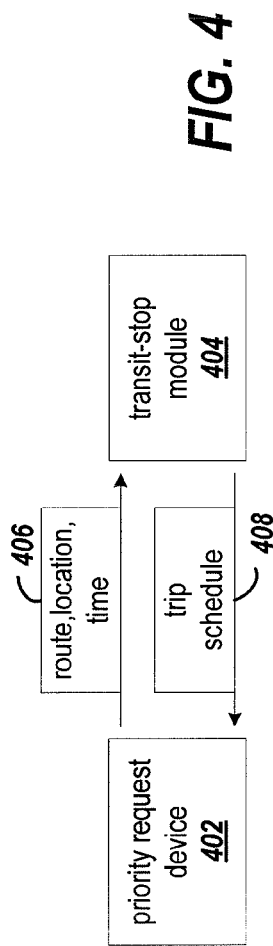
FIG. 4 shows a data flow between a priority request device and a transit-stop module for selecting a trip schedule for the transit vehicle having the priority request device.
Figure 5:
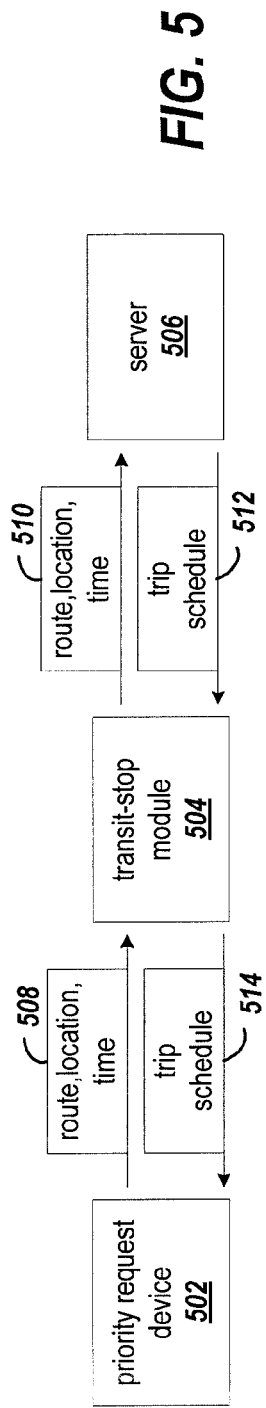
FIG. 5 shows a data flow between a priority request device, a transit-stop module, and a server for selecting a trip schedule for the transit vehicle having the priority request device.
Figure 6:
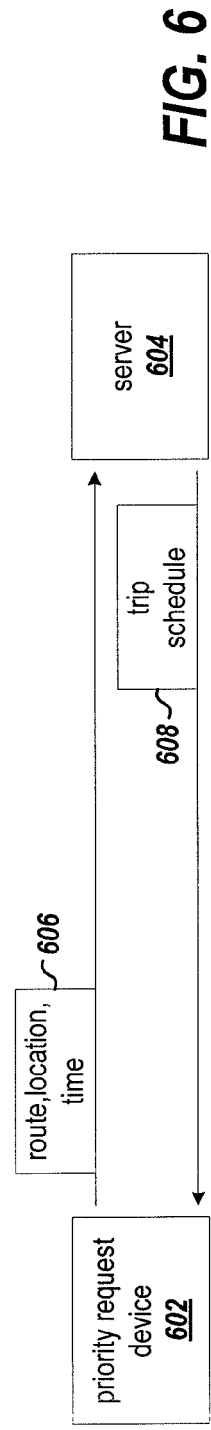
FIG. 6 shows a data flow between a priority request device and a server for selecting a trip schedule for the transit vehicle having the priority request device.

FIGS. 4, 5, and 6 show alternative systems and approaches for determining a trip schedule and configuring a priority request device aboard a transit vehicle. The processing associated with selecting a trip schedule may be performed by the priority request device on a vehicle, by a transit-stop module, or by a server that is communicatively coupled to the priority request devices and/or transit-stop modules. In one implementation, the priority request device on a vehicle is configured with the database of trip schedules, and a computer processor of the priority request device searches for a matching trip schedule as described above. FIGS. 4, 5, and 6 show alternative approaches in which a transit-stop module and/or a server are involved in selecting a trip schedule.

FIG. 4 shows a data flow between a priority request device 402 and a transit-stop module 404 for selecting a trip schedule for the transit vehicle having the priority request device. The priority request device may be mounted in the transit vehicle and may be a processor-based system that is connected to components that rely on satellite positioning systems, such as the GPS, to determine a vehicle's position and heading. Each transit stop may have a transit-stop module that includes a processor and a memory and/or storage arrangement that is configured with geographical coordinates of the transit stop (or coordinates that define the boundaries of the transit stop) and trip schedule information. The priority request device and transit stop module may have circuitry and execute software for communicating via a wireless network.

The trip schedule information in the database (not shown) of the transit stop module 404 may describe all routes and all trips within a transit system. Alternatively, the trip schedule information in the transit stop module may be limited to routes having trips that include the transit stop at which the transit stop module is located. The trip schedule information may include route identifiers and indications of which trip schedules are associated with which route identifiers. For each trip schedule, the trip schedule information specifies coordinates of the starting location and stop locations of the trip schedule, the start time associated with the starting location and arrival and/or departure times associated with each stop location, and optionally a heading.

The priority request device 402 transmits to the transit stop module 404 data that identify the route, the current geographical location of the transit vehicle, the current time, and optionally, the heading, as shown by block 406. The transit stop module searches a database (not shown) for a matching trip schedule. A matching trip schedule may be determined as described above. The transit stop module transmits the trip schedule information that describes the matching trip to the priority request device as shown by block 408. The priority request device uses the selected trip schedule information to enable or disable TSP requests, display scheduling information to a driver, and/or communicate scheduling information to a central dispatcher, riders, or to other devices on other transit vehicles.

In an alternative implementation, the priority request device on the transit vehicle stores the database of trip schedule information and determines which of the trip schedules matches the route, location, and current time.

FIG. 5 shows a data flow between a priority request device 502, a transit-stop module 504, and a server 506 for selecting a trip schedule for the transit vehicle having the priority request device. The priority request device, transit stop module, and server may have circuitry and execute software for communicating via a wireless network or a combination of wireless and wired networks.

The priority request device transmits to the transit stop module data that identify the route, the current geographical location of the transit vehicle, the current time, and optionally, the heading, as shown by block 508. The transit stop module passes the information received from the priority request device to the server as shown by block 510.

The server 506 searches a database (not shown) for a matching trip schedule. A matching trip schedule may be determined as described above. The server transmits the trip schedule information that describes the matching trip to the transit stop module as shown by block 512, and the transit stop module passes the trip schedule information to the priority request device as shown by block 514. The priority request device uses the selected trip schedule information as described above.

FIG. 6 shows a data flow between a priority request device 602 and a server 604 for selecting a trip schedule for the transit vehicle having the priority request device. The priority request device and server may have circuitry and execute software for communicating via a wireless network or a combination of wireless and wired networks. The priority request device transmits to the server data that identify the route, the current geographical location of the transit vehicle, the current time, and optionally, the heading, as shown by block 606. The server searches a database (not shown) for a matching trip schedule. A matching trip schedule may be determined as described above. The server transmits the trip schedule information that describes the matching trip to the priority request device as shown by block 608. The priority request device uses the selected trip schedule information as described above.

FIGS. 4, 5, and 6 show systems in which the priority request device is configured to determine whether or not the transit vehicle is ahead of or behind schedule and take appropriate action. In an alternative arrangement, a centralized server may be configured to take actions based on whether or not the transit vehicle is ahead of or behind schedule. In such an arrangement, the server is communicatively coupled to components on the transit vehicles, and the components on the transit vehicles communicate location and heading information to the server. In response to the location and heading information, the server selects trip schedules for the transit vehicles and takes appropriate actions. For example, the server may issue TSP requests to intersections, transmit scheduling information to transit vehicles for displaying to a driver, and/or communicating scheduling information to riders or to other devices on multiple transit vehicles.

Figure 7:
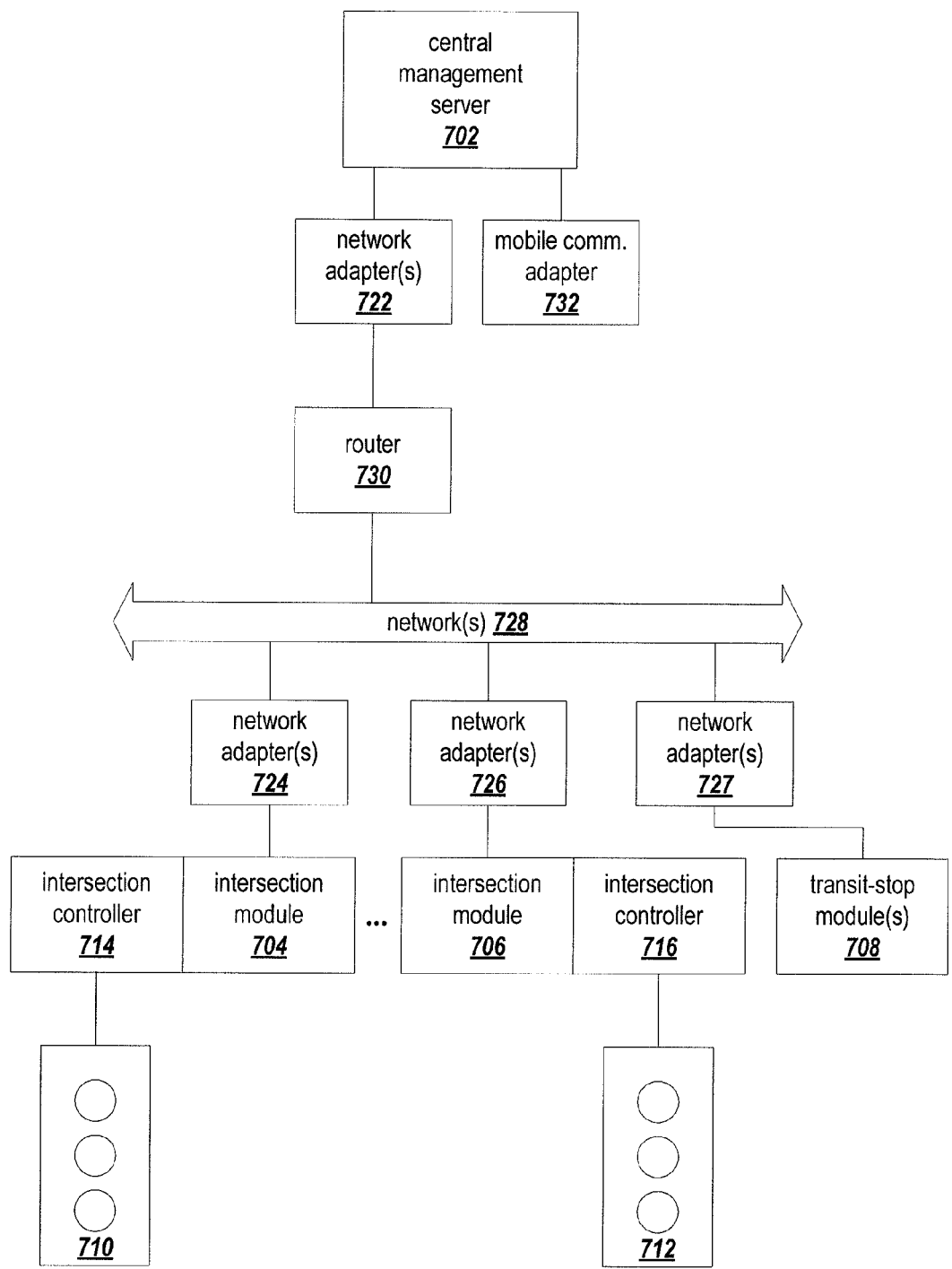
FIG. 7 shows a diagram of a system in which a server is coupled to intersection modules and to one or more transit-stop modules.

FIG. 7 shows a diagram of a system in which a server 702 is coupled to intersection modules 704 and 706 and to one or more transit-stop modules 708. The server may be programmed to perform the processes previously described. Traffic lights 710 and 712, which may be disposed at separate intersections, are coupled to intersection controllers 714 and 716, respectively. Intersection controllers 714 and 716 are connected to respective intersection modules 704 and 706. The central management server, intersection modules, and transit-stop module 708 are respectively coupled to network adapters 722, 724, 726, and 727 for communication over a network 728. In various embodiments, a router or a network switch, as shown by router 730, may be coupled between the network adapter and the network. It is understood that the central management server and the intersection modules may be connected through more than one network, coupled by additional switches and routing resources, including a connection over the Internet. It is understood that numerous network transfer protocols may be used to establish, maintain, and route connections including: TCP/IP, UDP, NFS, ESP, SPX, etc. It is also understood that network transfer protocols may utilize one or more lower layers of protocol communication such as ATM, X.25, or MTP, and on various physical and wireless networks such as, Ethernet, ISDN, ADSL, SONET, IEEE 802.11, V.90/v92 analog transmission, etc.

The server 702 may further be coupled to a mobile communication adapter 732. The mobile communication adapter interfaces to a wireless communications network, such as a cellular network and provides communications between the server and the priority request devices in transit vehicles.

Further description of the intersection controllers and intersection modules, as well as the previously described priority request devices, may be found in U.S. Pat. No. 5,539,398, which is incorporated herein by reference in its entirety. U.S. Pat. No. 8,884,783, entitled "Systems and Methods for Controlling Preemption of a Traffic Signal," is also incorporated herein by reference in its entirety.

Figure 8:
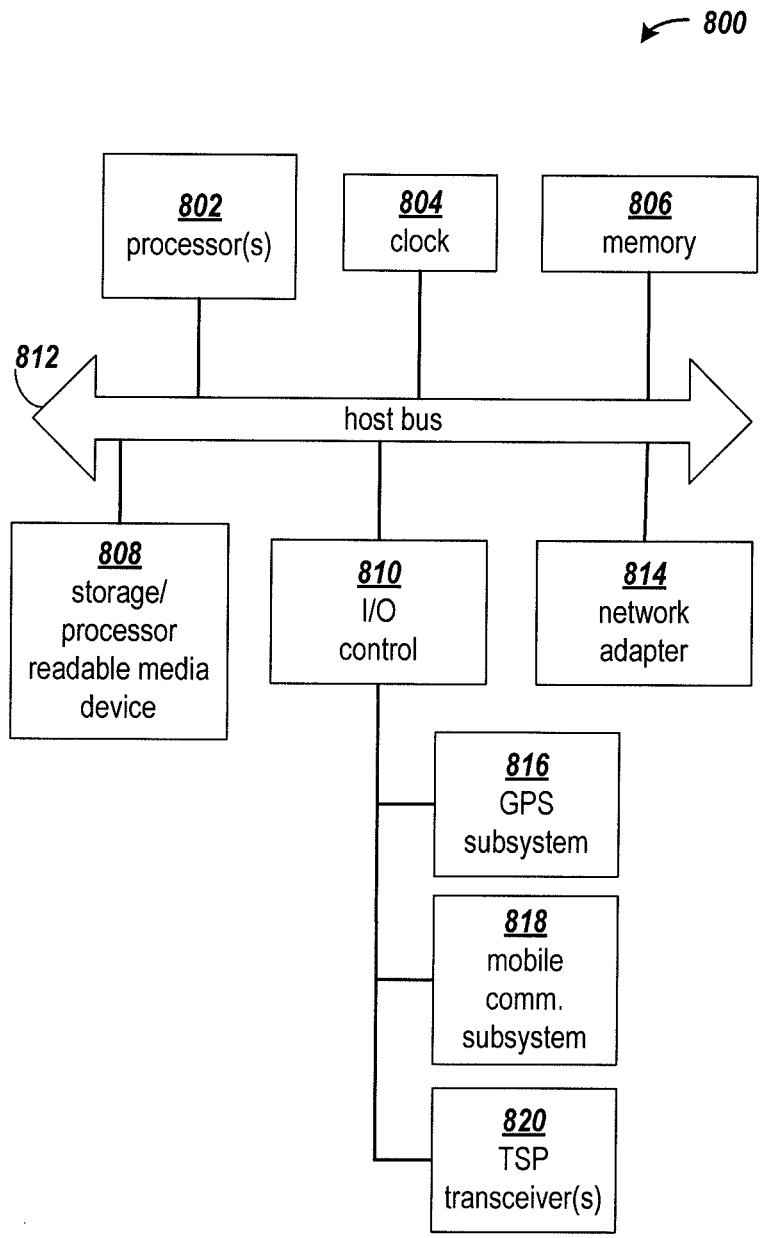
FIG. 8 shows an example of a processor-based computing arrangement that may be adapted for use in a priority request device, a transit-stop module or in a server.

FIG. 8 shows an example of a processor-based computing arrangement 800 that may be adapted for use in a priority request device, a transit-stop module or in a server. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Computing arrangement 800 includes one or more processors 802, a clock signal generator 804, a memory arrangement 806, a storage arrangement 808, an input/output control unit 810, and a network adapter 814, all coupled to a host bus 812. The arrangement 800 may be implemented with separate components on a circuit board or may be implemented as a system on a chip.

The architecture of the computing arrangement depends on implementation requirements as would be recognized by those skilled in the art. The processor(s) 802 may be one or more general purpose processors, or a combination of one or more general purpose processors and suitable co-processors, one or more specialized processors (e.g., RISC, CISC, pipelined, etc.), or a multi-core processor, as specifically programmed to perform the algorithms described herein.

The memory arrangement 806 typically includes multiple levels of cache memory, and a main memory. The storage arrangement 808 may include local and/or remote persistent storage, such as provided by magnetic disks (not shown), flash, EPROM, or other non-volatile data storage. The storage device may be read or read/write capable. Further, the memory arrangement 806 and storage arrangement 808 may be combined in a single arrangement.

The processor(s) 802 executes the software from storage arrangement 808 and/or memory arrangement 806, reads data from and stores data to the storage arrangement 808 and/or memory arrangement 806, and communicates with external devices through the input/output control arrangement 810. These functions are synchronized by the clock signal generator 804. The resources of the computing arrangement may be managed by either an operating system (not shown), or a hardware control unit (not shown).

Different elements may be connected to the I/O control circuit 810 depending on whether the processing arrangement is used in a priority request device, a transit-stop module or in a server. The GPS subsystem 816 includes a receiver for receiving satellite positioning signals and providing real-time location information to the processor(s). The GPS subsystem may be integrated as part of the computing arrangement 800 or as a stand-alone module connected to the computing arrangement. The GPS subsystem may be unnecessary in the implementation of a server.

The mobile communications subsystem 818 provides mobile communication interfaces to the computing arrangement 800. The interfaces may be to cellular communications systems, Mesh, or 802.11, for example. The mobile communications subsystem may be unnecessary depending on implementation requirements.

The TSP transceiver(s) 820 sends TSP requests to an intersection module in response to programmed control by the processor(s) 802 and may be configured to receive data from the intersection modules. The TSP transceiver(s) may be unnecessary in the implementation of a transit-stop module and in some implementations of a server.

Though aspects and features may in some cases be described in individual figures, it will be appreciated that features from one figure can be combined with features of another figure even though the combination is not explicitly shown or explicitly described as a combination.

The present invention is thought to be applicable to a variety of systems for controlling the flow of traffic. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of managing transit vehicle schedules, comprising:
   determining a current location and current heading of a transit vehicle by a global positioning system (GPS) module aboard the transit vehicle and communicating the current location and current heading to a computer processor;
   determining a current time and current day by the computer processor;
   selecting one trip schedule from a plurality of trip schedules in a database by the computer processor, the one trip schedule having attributes consistent with the current location, current heading, current time, and current day;
   determining whether the transit vehicle is ahead of the one trip schedule or behind the one trip schedule; and
   outputting a signal that indicates whether the transit vehicle is ahead of the one trip schedule or behind the one trip schedule;
   wherein each trip schedule of the plurality of trip schedules specifies a starting location having an associated heading, an associated start time, and an associated day, and each trip schedule further specifies a plurality of stop locations and associated stop times, and the selecting the trip schedule includes:
  determining that none of the plurality of trip schedules in the database has a starting location that matches the current location; and
  in response to the determining that none of the plurality of trip schedules in the database has a starting location that matches the current location, selecting from the plurality of trip schedules in the database, the one trip schedule that specifies a stop location that matches the current location and a starting location having an associated start time that is later than the current time and earlier than the start times later than the current time and associated with other trip schedules of the plurality of trip schedules;
  determining a difference between the current time and the start time associated with the starting location of the one trip schedule; and
  adjusting stop times associated with the stop locations of the one trip schedule by the difference.

2. The method of claim 1, wherein:
the selecting includes determining that the starting location of the one trip schedule matches the current location, the starting location of the one trip schedule has an associated heading that matches the current heading, an associated day of the one trip schedule matches the current day, and an associated start time of the one trip schedule matches the current time; and
the determining whether the transit vehicle is ahead of or behind the one trip schedule includes:
  periodically updating the current time, location, and heading;
  determining a next stop location;
  determining an estimated time of arrival (ETA) at the next stop location;
  determining that the transit vehicle is ahead of the one trip schedule in response to the ETA being earlier than the stop time associated with the next stop location; and
  determining that the transit vehicle is behind the one trip schedule in response to the ETA being later than the stop time associated with the next stop location.

3. The method of claim 1, further comprising:
enabling a priority request device to make traffic signal priority (TSP) requests in response to the signal indicating the transit vehicle is behind the one trip schedule; and
disabling the priority request device from making TSP requests in response to the signal indicating the transit vehicle is ahead of the one trip schedule.

4. A system for managing transit vehicle schedules, comprising:
a priority request device configured to be mounted to a transit vehicle and including:
  a memory;
  a global positioning system (GPS) module;
  a computer processor coupled to the memory and to the GPS module;
  wherein the memory is configured to store a plurality of trip schedules and instructions that when executed by the computer processor cause the computer processor to:
    determine a current time, a current day, a current location, and a current heading of the transit vehicle from the GPS module;
    select one trip schedule from the plurality of trip schedules, the one trip schedule having attributes consistent with the current time, the current day, the current location, and the current heading of the transit vehicle;
    determine whether the transit vehicle is ahead of the one trip schedule or behind the one trip schedule; and
    output a signal that indicates whether the transit vehicle is ahead of the one trip schedule or behind the one trip schedule;
  wherein each trip schedule of the plurality of trip schedules specifies a starting location having an associated heading, an associated start time, and an associated day, and each trip schedule further specifies a plurality of stop locations and associated stop times, and the instructions that select the trip schedule include instructions that:
    determine that none of the plurality of trip schedules has a starting location that matches the current location; and
    select, in response to the determining that none of the plurality of trip schedules has a starting location that matches the current location, from the plurality of trip schedules, the one trip schedule that specifies a stop location that matches the current location and a starting location having an associated start time that is later than the current time and earlier than the start times later than the current time and associated with other trip schedules of the plurality of trip schedules;
    determine a difference between the current time and the start time associated with the starting location of the one trip schedule; and
    adjust stop times associated with the stop locations of the trip schedule by the difference.

5. The system of claim 4, wherein:
the instructions that select include instructions that determine that the starting location of the one trip schedule matches the current location, the starting location of the one trip schedule has an associated heading that matches the current heading, an associated day of the one trip schedule matches the current day, and an associated start time of the one trip schedule matches the current time; and
the instructions that determine whether the transit vehicle is ahead of or behind the one trip schedule include instructions that:
  periodically update the current time, location, and heading;
  determine a next stop location;
  determine an estimated time of arrival (ETA) at the next stop location;
  determine that the transit vehicle is ahead of the one trip schedule in response to the ETA being earlier than the stop time associated with the next stop location; and
  determine that the transit vehicle is behind the one trip schedule in response to the ETA being later than the stop time associated with the next stop location.

6. The system of claim 4, wherein the memory is further configured with instructions that when executed by the computer processor cause the computer processor to:
  enable making traffic signal priority (TSP) requests in response to the signal indicating the transit vehicle is behind the one trip schedule; and
  disable making TSP requests in response to the signal indicating the transit vehicle is ahead of the one trip schedule.

7. A system for managing transit vehicle schedules, comprising:
  a priority request device configured to be mounted to a transit vehicle and configured to:
    determine a current time, a current day, a current location and a current heading of the transit vehicle; and
    transmit data specifying the current time, the current day, the current location, and the current heading of the transit vehicle;
  a transit-stop module configured for placement at a transit stop and configured to:
    store a plurality of trip schedules;
    receive the data specifying the current time, the current day, the current location, and the current heading of the transit vehicle;
    select one trip schedule from the plurality of trip schedules, the one trip schedule having attributes consistent with the data specifying the current time, the current day, the current location, and the current heading of the transit vehicle; and
    transmit the one trip schedule to the priority request device;
  wherein the priority request device is further configured to:
    determine whether the transit vehicle is ahead of the one trip schedule or behind the one trip schedule; and
    output a signal that indicates whether the transit vehicle is ahead of the one trip schedule or behind the one trip schedule;
  wherein each trip schedule of the plurality of trip schedules specifies a starting location having an associated heading, an associated start time, and an associated day, and each trip schedule further specifies a plurality of stop locations and associated stop times, and the transit-stop module configured is further configured to:
    determine that none of the plurality of trip schedules has a starting location that matches the current location; and
    select, in response to the determining that none of the plurality of trip schedules has a starting location that matches the current location, from the plurality of trip schedules, the one trip schedule that specifies a stop location that matches the current location and a starting location having an associated start time that is later than the current time and earlier than the start times later than the current time and associated with other trip schedules of the plurality of trip schedules;
    determine a difference between the current time and the start time associated with the starting location of the one trip schedule; and
    adjust stop times associated with the stop locations of the trip schedule by the difference.

8. A system for managing transit vehicle schedules, comprising:
  a priority request device configured to be mounted to a transit vehicle and configured to:
    determine a current time, a current day, a current location and a current heading of the transit vehicle; and
    transmit data specifying the current time, the current day, the current location, and the current heading of the transit vehicle;
  a transit-stop module configured for placement at a transit stop and configured to:
    receive the data specifying the current time, the current day, the current location, and the current heading of the transit vehicle from the priority request device; and
    transmit the data specifying the current time, the current day, the current location, and the current heading of the transit vehicle;
  a server coupled to the transit-stop module and configured to:
    store a plurality of trip schedules;
    receive the data specifying the current time, the current day, the current location, and the current heading of the transit vehicle from the transit-stop module;
    select one trip schedule from the plurality of trip schedules, the one trip schedule having attributes consistent with the data specifying the current time, the current day, the current location, and the current heading of the transit vehicle; and
    transmit the one trip schedule to the transit-stop module;
  wherein the transit-stop module is further configured to:
    receive the one trip schedule from the server; and
    transmit the one trip schedule to the priority request device;
  wherein the priority request device is further configured to:
    determine whether the transit vehicle is ahead of the one trip schedule or behind the one trip schedule; and
    output a signal that indicates whether the transit vehicle is ahead of the one trip schedule or behind the one trip schedule;
  wherein each trip schedule of the plurality of trip schedules specifies a starting location having an associated heading, an associated start time, and an associated day, and each trip schedule further specifies a plurality of stop locations and associated stop times, and the server is further configured to:
    determine that none of the plurality of trip schedules has a starting location that matches the current location; and
    select, in response to the determining that none of the plurality of trip schedules has a starting location that matches the current location, from the plurality of trip schedules, the one trip schedule that specifies a stop location that matches the current location and a starting location having an associated start time that is later than the current time and earlier than the start times later than the current time and associated with other trip schedules of the plurality of trip schedules;
    determine a difference between the current time and the start time associated with the starting location of the one trip schedule; and
    adjust stop times associated with the stop locations of the trip schedule by the difference.

9. A system for managing transit vehicle schedules, comprising:
  a priority request device configured to be mounted to a transit vehicle and configured to:
    determine a current time, a current day, a current location and a current heading of the transit vehicle; and
    transmit data specifying the current time, the current day, the current location, and the current heading of the transit vehicle;
  a server communicatively coupled to the priority request device and configured to:
    store a plurality of trip schedules;

receive the data specifying the current time, the current day, the current location, and the current heading of the transit vehicle;

select one trip schedule from the plurality of trip schedules, the one trip schedule having attributes consistent with the data specifying the current time, the current day, the current location, and the current heading of the transit vehicle; and transmit the one trip schedule to the priority request device;

wherein the priority request device is further configured to:

determine whether the transit vehicle is ahead of the one trip schedule or behind the one trip schedule; and output a signal that indicates whether the transit vehicle is ahead of the one trip schedule or behind the one trip schedule;

wherein each trip schedule of the plurality of trip schedules specifies a starting location having an associated heading, an associated start time, and an associated day, and each trip schedule further specifies a plurality of stop locations and associated stop times, and the server is further configured to:

determine that none of the plurality of trip schedules has a starting location that matches the current location; and select, in response to the determining that none of the plurality of trip schedules has a starting location that matches the current location, from the plurality of trip schedules, the one trip schedule that specifies a stop location that matches the current location and a starting location having an associated start time that is later than the current time and earlier than the start times later than the current time and associated with other trip schedules of the plurality of trip schedules;

determine a difference between the current time and the start time associated with the starting location of the one trip schedule; and adjust stop times associated with the stop locations of the trip schedule by the difference.

* * * * *